United States Patent Office 2,911,787
Patented Nov. 10, 1959

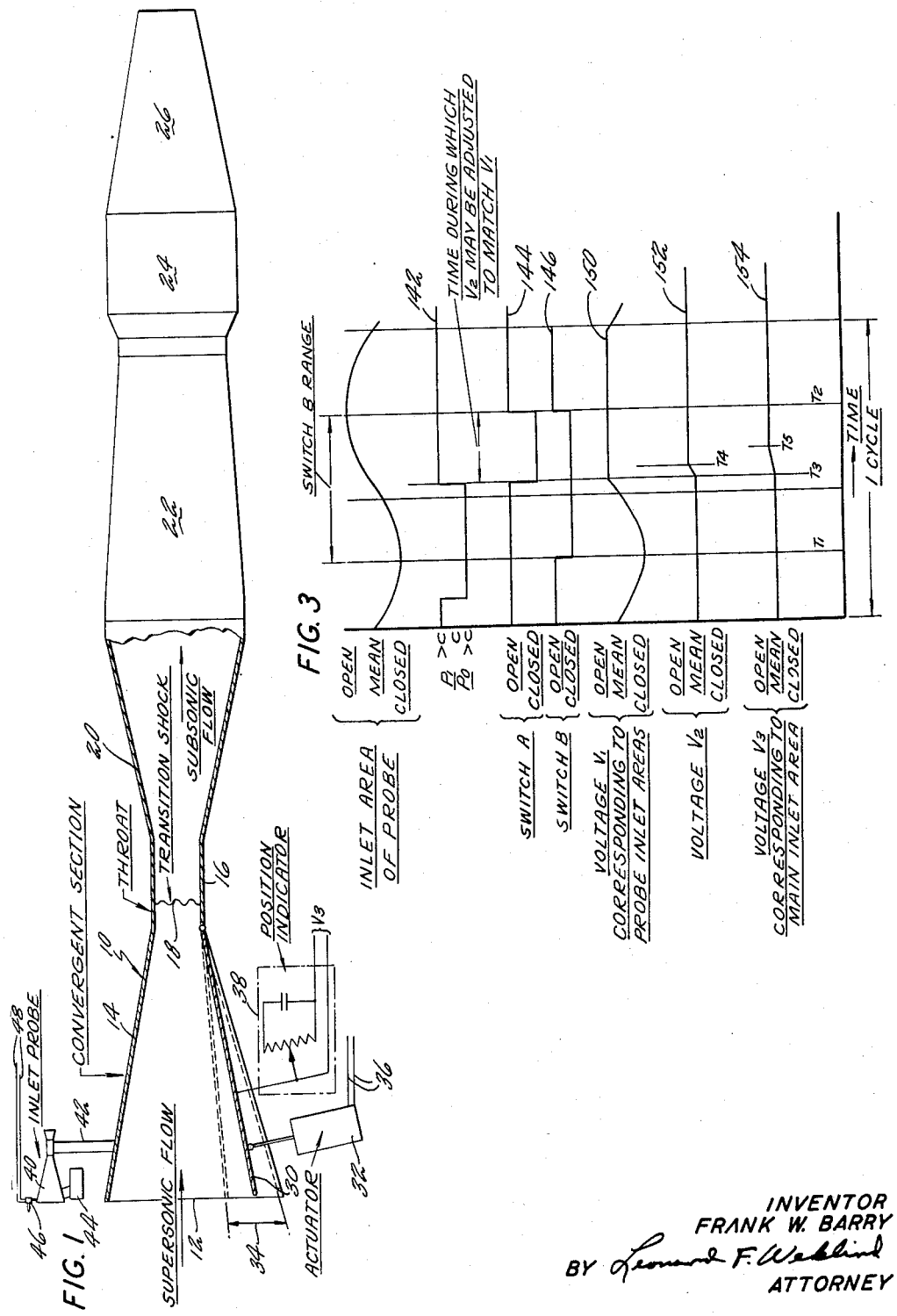

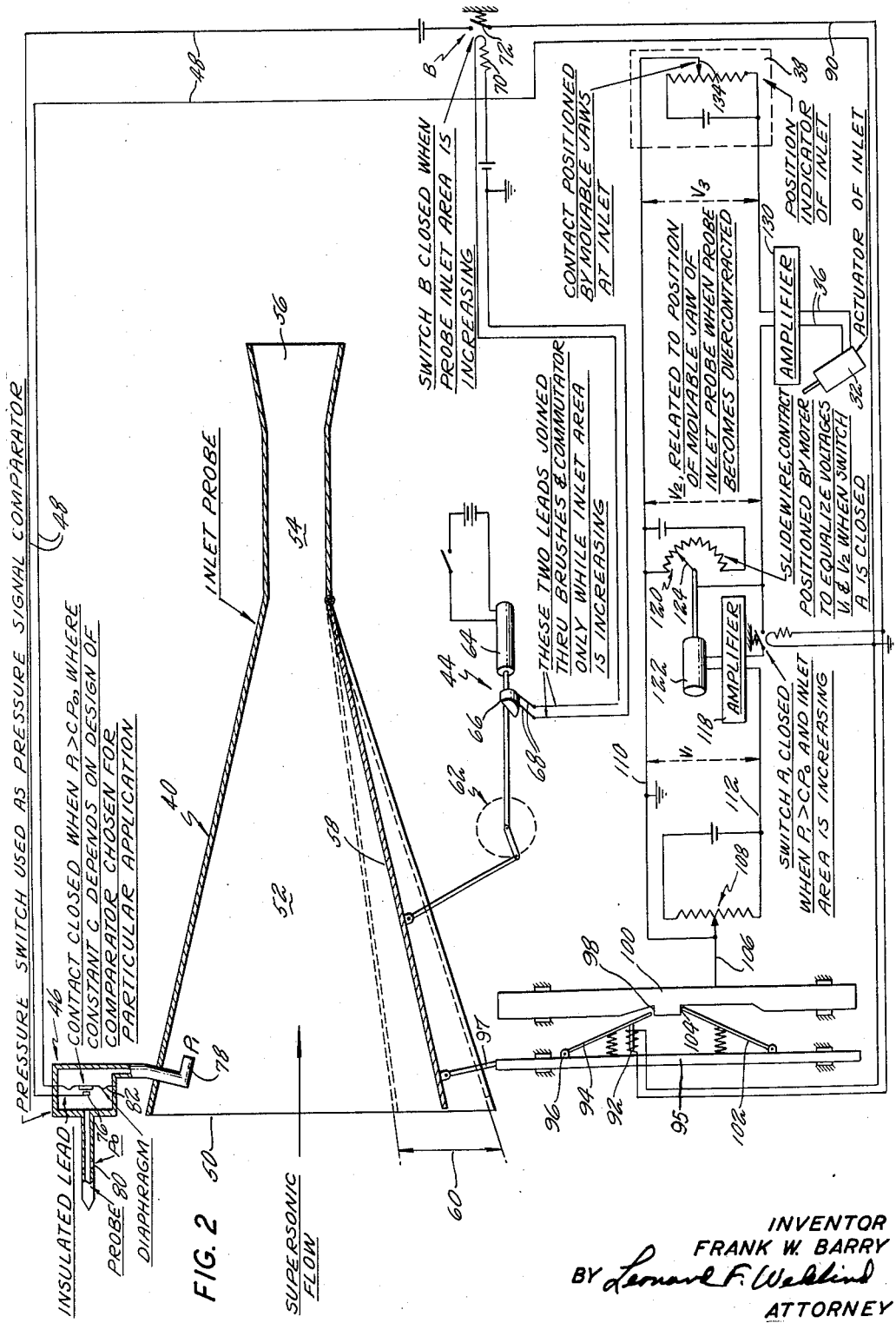

2,911,787

INLET PROBE

Frank W. Barry, Manchester, Conn., assignor to United Aircraft Corporation, East Hartford, Conn., a corporation of Delaware Application May 6, 1957, Serial No. 657,451

12 Claims. (Cl. 60—35.6)

This invention relates to air inlets for power plants and more specifically to variable area inlets wherein high pressure recovery is obtained.

It is an object of this invention to provide a variable geometry inlet including means for preventing choking.

It is a further object of this invention to provide a variable geometry or variable area inlet or diffuser for supersonic operation including a highly efficient control therefor.

A still further object of this invention is to provide a main variable geometry inlet and a variable geometry probe inlet which has its geometry varied in a cyclic manner and to further provide a comparator for the conditions of both inlets at a predetermined time to provide a controlling signal for the main inlet.

These and other objects of this invention will become readily apparent from the following detailed description of the drawing in which:

Fig. 1 is a schematic illustration of a main inlet and power plant along with a probe inlet;

Fig. 2 is a schematic illustration of the probe inlet and wiring diagram indicating the control elements which eventually produce a control signal for the main inlet;

Fig. 3 is a cycle analysis indicating relative values of the various variables introduced in the system.

The air inlets of turbojet or ramjet propelled aircraft capable of high supersonic flight speeds are required to incorporate variable geometry and internal contraction in order to achieve acceptable efficiencies. For given supersonic flight conditions the inlet critical total pressure recovery increases as the inlet opening area is increased relative to the throat which is located downstream of the inlet. At proper operating conditions the flow into the leading edge opening of the inlet and into the throat will be supersonic. However, if the leading edge area is increased past the value corresponding to the peak critical pressure recovery, the throat of the inlet or diffuser will choke which will cause a shock to move forward and out of the leading edge of the inlet. This produces a detached shock thereby causing a certain amount of air to be spilled out around the inlet opening. Thus, the inlet does not take in the full amount of air necessary. A large drag results from spillage in this manner and since the engine thrust is usually lowered because of reduced pressure recovery the net thrust available to drive the aircraft is lowered considerably.

In order to achieve a high efficiency, it is therefore necessary to adjust the inlet area relative to the throat area so as to operate at peak critical pressure recovery (or slightly below) but to avoid choking. Choking must be avoided by reducing the inlet area in order to swallow the detached shock inasmuch as the associated pressure transient at the diffuser exit may cause a flame-out in the burner. The maximum inlet area which will avoid choking is dependent on flight conditions.

It is therefore a purpose of this invention to provide a small inlet probe to furnish an input or controlling signal to the system which controls the geometry of the full-scale inlet. This inlet probe is normally placed in the same flow field as the full-scale inlet and has a geometry which is similar to the full-scale inlet. In any event it is essential that the geometry at which the probe inlet chokes has a known relation to the geometry at which the full-scale inlet chokes. Thus, the geometry of the probe inlet is cycled or varied systematically so that the probe inlet first is closed to choke, then the detached shock is allowed to be swallowed, and then again the probe inlet is choked in a cyclic fashion. The particular geometry at which the probe inlet chokes may be obtained once each cycle at the proper time. The control system then compares this signal at a given time with the corresponding geometry of the full-scale inlet whereby a signal is generated to adjust the geometry of the full-scale inlet to avoid choking yet maintain high critical pressure recovery.

Referring to Fig. 1 a main air inlet is generally indicated at 10 as having an opening 12 which receives air for a convergent inlet diffuser portion 14. A throat section 16 at peak operation includes a shock 18 downstream of which the subsonic air passes through a divergent diffuser portion 20. The air from the divergent diffuser portion flows to a compressor 22, a combustion section 24 and eventually to an exhaust nozzle 26. The convergent portion of the main inlet includes at least one movable wall 30 which may be moved by any suitable actuator 32 through a range indicated by the line 34. The actuator 32 receives a suitable electrical signal via the lines 36. The actuator 32 may be a reversible electric motor or it may be a proportional solenoid which will respond to the value and sign of an electrical signal or voltage. The position of the wall 30 or in other words the geometry or the area of the main inlet is transferred into an electrical potential or voltage $V_3$ by means of a potentiometer schematically enclosed in the box 38. This box is also indicated by the dotted enclosure 38 shown in Fig. 2. The actuator 32 of Fig. 1 is also shown schematically in the bottom of Fig. 2.

A probe inlet 40 is carried by a suitable strut 42 and includes a cyclic area varying means 44 and a pressure sensing device 46 which sends a signal via the lines 48 to the control system. As better seen in Fig. 2 the probe inlet 40 includes a leading edge opening 50, a convergent diffuser portion 52, a throat region 54 and a divergent diffuser portion 56. The inlet probe 40 has at least one movable wall 58 which is cycled through a range indicated by the line 60 by means of a suitable cycling mechanism generally indicated at 44. The cycling mechanism moves the wall 58 to vary the geometry or area of the probe inlet 40 in systematic increasing and decreasing directions. The wall 58 is moved by a suitable crank 62 which is driven by an electrical motor 64. A semi-circular commutator 66 will pass a signal to the brushes 68 only through half the cycle of the probe inlet area. The commutator is connected to the brushes 68 only while the probe inlet area is increasing as indicated. Thus, a switch B is closed by a solenoid 70 against the tension spring 72 for half a cycle. Thus, the switch B is conducting or permits a signal to pass from the lines 48 during half of each cycle. However, the only time there will be a signal generated in the lines 48 is when the contacts 76 of the pressure responsive device 46 are closed. The pressure responsive device 46 receives a pressure $P_1$ from a line 78 leading internally of the inlet probe 40. A tap 80 provides a pressure $P_0$ which is equal to the static pressure of the airstream. The pressures $P_1$ and $P_0$ are compared through a diaphragm 82 and when the proper relative pressure values are achieved, the contacts 76 of the pressure responsive device 46 will cause a signal to pass through lines 48 and to the switch B. It will be noted in Fig. 2 from the caption on the drawing that when the pressure $P_1$ in the probe inlet becomes much greater than the pressure $P_0$ in the free airstream the contacts are closed. Thus, the pressure ratio signal in the lines 48 will be generated during the portion of the cycle in which the inlet probe is choked or when the ratio between the two pressures $P_1$ and $P_0$ exceeds a preset value.

Once the contacts 76 of the pressure responsive device 46 are closed and when the switch B is closed, a signal then is conducted via the line 90. This signal then passes to a switch A and also to a solenoid 92 adjacent the lefthand end of Fig. 2. The solenoid 92 is connected to a pawl-type member 94 which is spring loaded to pivot counterclockwise about the pivot 96. The pawl 94 is intended to engage a detent 98 carried by the slide bar 100. Another pawl 102 engages a cooperating detent 104 on the bar 100. The pawls 94 and 102 are pivotally carried by a bar 95 which is reciprocated by inlet wall 58 through a crank rod 97. The bar 100 moves a slide wire 106 of a potentiometer 108. Thus, the position of the slide wire 106 of the potentiometer 108 is normally an indication of the position of the movable wall 58 of the probe inlet. The slide wire 106 then produces a voltage indicated across the lines 110 and 112 as $V_1$.

The particular position of the movable wall 58 when choking occurs will give an instantaneous voltage $V_1$ across the lines 110 and 112. Thus, with all conditions being proper; that is, with the contacts 76 of the pressure responsive device 46 in a closed position and with the switch B closed, the solenoid 92 will draw the pawl 94 away from the detent 98 so that as the wall 58 of the probe diffuser continues to move in a more open position, the slide bar 100 will remain stationary since the pawl 94 is disengaged from the detent 98. In this moment with a voltage $V_1$ impressed across lines 110 and 112 and with the switch A closed, the amplifier 118 will have a signal comparing the voltage $V_1$ and the voltage $V_2$ generated by the potentiometer 120.

A reversible motor 122 may be utilized which will receive a signal commensurate with the value and sign of voltage $V_1$ and $V_2$ and rotate the slide wire 124 to equalize the voltages $V_1$ and $V_2$ at the particular instance of operation. The voltage $V_2$ then passes a signal to the amplifier 130 which passes a signal to the lines 36 (see also Fig. 1) to operate the actuator 32 thereby adjusting the position of the main inlet 10. When the main inlet 10 moves, then the sliding member 134 of the potentiometer 38 will be readjusted so that the voltage $V_3$ is adjusted so that no error signal appears at the amplifier 130. The potentiometer 38 is in fact a follow-up system to provide a null for the amplifier 130 when the main inlet has been adjusted to the proper area.

As seen in Fig. 3, the various variables are illustrated in diagrammatic form so as to clearly illustrate their relationship. Thus, it will be seen that the inlet area of the probe is cycled systematically similar to a sine wave. The relationship of the pressure $P_1$ in the probe inlet to the pressure $P_0$ in the free stream are next illustrated by line 142. The switch A will be closed only during that portion of the cycle (see line 144) when the pressure responsive device 46 indicates that the proper pressure relationship exists and when switch B is closed. Of course, switch B is closed for half the cycle as seen by line 146. The voltage $V_1$ is indicated as being substantially fixed along the horizontal line identified by the numeral 150 beginning about midway of the cycle but particularly when the contacts 76, switch A and switch B are closed.

It is desired to obtain a signal (voltage $V_2$) which is related to the geometry of the inlet probe 40 at the time during each cycle when the inlet area becomes too large and the inlet probe chokes. Thus, one limitation on the time at which the geometry of the inlet probe is to be obtained is that it must occur during the portion of the cycle between $T_1$ and $T_2$ when the inlet area is increasing.

As shown by line 146, switch B is closed during this portion of the cycle. As the inlet area increases from the minimum value at time $T_1$, the ratio of pressure $P_1$ to pressure $P_0$ remains below a predetermined value C until time $T_3$ is reached when the inlet chokes. Therefore, between times $T_3$ and $T_2$ contact 76 and switch B are both closed, thus energizing solenoid 92 to withdraw pawl 94 and closing switch A, as shown by line 144. Between times $T_1$ and $T_3$ the voltage $V_1$ shown by line 150 has varied in accordance with the variation in inlet area produced by the motion of the movable wall 58. Following time $T_3$ the voltage $V_1$ is constant until the inlet area becomes smaller than the inlet area at time $T_3$. If while switch A is closed between times $T_3$ and $T_2$ the voltage $V_2$ differs from voltage $V_1$, the reversible motor 122 will adjust the slide wire 124 to equalize the voltages $V_1$ and $V_2$, as shown by line 152 where equality is achieved at time $T_4$. Since switch A is open except between times $T_3$ and $T_2$, voltage $V_2$ is constant except while $V_2$ differs from $V_1$ during the time interval between $T_2$ and $T_3$, or between $T_4$ and $T_3$, if $V_2$ becomes equal to $V_1$ before $T_2$. Whenever $V_2$ differs from $V_3$, the actuator 32 is energized to move the wall 30 in a direction to make $V_3$ equal to $V_2$. Thus, in Fig. 3 $V_2$ and $V_3$ are equal prior to time $T_3$ but, when $V_2$ starts to change a time $T_3$, voltage $V_3$ is changed until it again equals $V_2$ at time $T_5$. At time $T_5$ the voltage $V_3$ equals the voltage $V_1$ at the time $T_3$ during the cycle when the inlet probe choked and consequently, the main air inlet bears the desired geometric relationship to the geometry at which the inlet probe chokes. The voltages $V_2$ and $V_3$ are shown by the lines 152 and 154, respectively.

As a result of this invention it will be apparent that a very simple yet highly accurate variable area inlet control has been provided. Furthermore, where variable-geometry inlet control systems of the past have had to use intricate signals relating to flight signals, the choking geometry signal supplied by the inlet probe described herein automatically compensates for these factors and does not require a complicated schedule derived from extensive wind tunnel tests to enable the inlet control system to convert the incoming signals to an optimum geometry.

Although only one embodiment of this invention has been illustrated and described herein, it will become apparent that various changes and modifications may be made in the construction and arrangement of the various parts without departing from the scope of this novel concept.

What it is desired by Letters Patent is:

1. An inlet for a power plant and receiving air from a supersonic airstream, first means for varying the geometry of said inlet, a probe inlet exposed to the airstream, said inlets having similar operating characteristics, means for cyclically varying the geometry of said probe inlet, means for sensing the internal air flow conditions of said probe inlet, and means responsive to said sensing means for controlling said first varying means.

2. An inlet for a power plant and receiving air from a supersonic airstream, first means for varying the geometry of said inlet, a probe inlet exposed to the airstream, said inlets having similar operating characteristics, means for cyclically varying the geometry of said probe inlet, means for sensing pressure conditions and geometry of said probe inlet, and means responsive to said sensing means for controlling said first varying means.

3. An inlet for a power plant and receiving air from a supersonic airstream, first means for varying the geometry of said inlet, a probe inlet exposed to the airstream, said inlets having similar operating characteristics, means for cyclically changing the geometry of said probe inlet, means for sensing a pressure, the geometry, and direction of geometry change of said probe inlet, and means responsive to said sensing means for controlling said first varying means.

4. In a supersonic free airstream, a variable geometry main inlet for ingesting air into a power plant including at least one first movable element to vary the geometry of the main inlet, a variable-geometry probe inlet exposed to the free airstream and including at least one second movable element to vary the geometry of the probe inlet, said inlets having similar operating characteristics, means for cyclically moving said second movable element, means for sensing an operative condition of said probe inlet for producing a first signal, means responsive to the geometry of said probe inlet for producing a second signal, means responsive to the geometry of said main inlet for producing a third signal, means for comparing said second and third signals and producing a controlling signal, said controlling signal being conducted when said first signal is produced, and means for conducting said controlling signal to move said first movable element.

5. In a supersonic free airstream, a variable geometry inlet for ingesting air into a power plant including at least one first movable element to vary a cross-sectional dimension of the main inlet, a variable geometry probe inlet exposed to the free airstream and including at least one second movable element to vary a cross-sectional dimension of the probe inlet, said inlets having similar operating characteristics, means for cyclically moving said second movable element at a predetermined frequency, means for sensing an operative pressure condition of said probe inlet for producing a first signal, means for producing a second signal which is alternately conductive and nonconductive at a rate commensurate with said predetermined frequency, means responsive to the geometry of said probe inlet for producing a third signal, means responsive to the geometry of said main inlet for producing a fourth signal, means for comparing said third and fourth signals and producing a controlling signal, said controlling signal being conducted when said first signal is produced and said second signal is conductive, and means for conducting said controlling signal to move said first movable element.

6. In a supersonic free airstream, a variable geometry inlet for ingesting air into a power plant including at least one first movable element to vary a cross-sectional dimension of the main inlet, a variable geometry probe inlet exposed to the free airstream and including at least one second movable element to vary a cross-sectional dimension of the probe inlet, said inlets having similar operating characteristics, means for cyclically moving said second movable element at a predetermined frequency, means for sensing an operative pressure condition of said probe inlet for producing a first signal, means for producing a second signal which is conductive in a range of positions of said second movable element, means responsive to the geometry of said probe inlet for producing a third signal including operative connections to said position sensing means, means responsive to the geometry of said main inlet for producing a fourth signal, means for comparing said third and fourth signals and producing a controlling signal, said controlling signal being conducted when said first signal is produced and said second signal is conductive, and means for conducting said controlling signal to move said first movable element.

7. In a supersonic free airstream, a variable geometry main air inlet for a power plant, said inlet including at least one movable main wall, means for adjusting the position of said main wall to vary at least one area of said inlet, a probe inlet exposed to the same airstream as the main inlet, means for varying the geometry of said probe inlet including at least one movable probe wall, means for cyclically moving said probe wall at a predetermined frequency, means for sensing an operating condition of said probe inlet for producing a first signal, and means for sensing an instantaneous geometry of said probe inlet to produce a second signal, means for producing a third signal commensurate with a characteristic of said main inlet, comparator means for comparing said second and third signals and adjusting said third signal to substantially equalize its value with said second signal, and means responsive to said comparator means for controlling said main wall adjusting means when said first signal reaches a predetermined value.

8. In a variable geometry main air inlet for a power plant for receiving air from a supersonic airstream, said inlet including at least one movable main wall, means for adjusting the position of said wall for varying the area of said main inlet, a probe inlet having operating characteristics related to that of the main inlet and exposed to the airstream, means for cyclically varying the area of said probe diffuser at a predetermined frequency, means for sensing the static pressure of the airstream and means for sensing the static pressure in said probe inlet, means for comparing said pressures, means responsive to a predetermined relationship of said pressures for producing a first signal, means for producing a second signal commensurate with the position of said area varying means for said probe inlet, means for producing a third signal commensurate with the position of said main inlet adjusting means, and means for comparing said second and third signals for controlling said main inlet adjusting means when said first signal is produced.

9. In a supersonic free airstream, a variable geometry main air inlet for a power plant, said inlet including at least one movable main wall, means for adjusting the position of said main wall to vary at least one area of said inlet, a probe inlet exposed to the same airstream as the main inlet, means for varying the geometry of said probe inlet including at least one movable probe wall, means for cyclically moving said probe wall at a predetermined frequency, means for sensing an operating condition of said probe inlet for producing a first signal, and means for sensing an instantaneous geometry of said probe inlet to produce a second signal, means for producing a third signal commensurate with a characteristic of said main inlet, comparator means for comparing said second and third signals and adjusting said third signal to substantially equalize its value with said second signal, and means responsive to said comparator means for controlling said main wall adjusting means.

10. In a variable geometry main air inlet for a power plant for receiving air from a supersonic airstream, said inlet including at least one movable main wall, means for adjusting the position of said wall for varying the area of said main inlet, a probe inlet having operating characteristics related to that of the main inlet and exposed to the airstream, means for cyclically varying the area of said probe inlet at a predetermined frequency, means for producing a first signal commensurate with the position of said area varying means for said probe inlet, means for producing a second signal commensurate with the position of said main inlet adjusting means, and means for comparing said signals for controlling said main inlet adjusting means when a predetermined operating condition of said probe inlet exists.

11. An air inlet for a power plant receiving a supersonic airstream, first means for varying the area of said intake including at least one first movable element, a probe inlet having predetermined operating characteristics relative to the main inlet and exposed to the airstream, second means for varying the area of said probe inlet including a second movable element and mechanism for moving said element in area increasing and area decreasing directions, a first switch movable to a closed position when a predetermined pressure relationship exists in said probe inlet, a second switch movable to a closed position when the area of said probe inlet is increasing, a third switch movable to a closed position when both said first and second switches are closed, means responsive to the position of said second movable member for creating a first voltage, said voltage being conducted when said third switch is closed, means for producing a second voltage commensurate with a characteristic of said probe inlet, means responsive to the position of said first member for creating a third voltage, and means responsive to said second voltage and said third voltage for moving said first member to vary the area of said main inlet.

12. An air inlet for a power plant receiving a supersonic airstream, first means for varying the area of said intake including at least one first movable element, a probe inlet having predetermined operating characteristics relative to the main inlet and exposed to the airstream, second means for varying the area of said probe inlet including a second movable element and mechanism for moving said element in area increasing and area decreasing directions, a first switch movable to a closed position when a predetermined pressure relationship exists in said probe inlet, a second switch movable to a closed position when the area of said probe inlet is increasing, a third switch movable to a closed position when both said first and second switches are closed, means responsive to the position of said second movable member for creating a first voltage, said voltage being conducted when said third switch is closed, means for producing a second voltage commensurate with a characteristic of said probe inlet, means for equalizing said voltages, means responsive to the position of said first member for creating a third voltage, and means responsive to said second voltage and said third voltage for moving said first member to vary the area of said main inlet.

References Cited in the file of this patent

UNITED STATES PATENTS 2,817,209     Besserer _____ Dec. 24, 1957